United States Patent [19]

Yokota

[11] 4,089,221

[45] May 16, 1978

[54] WOBBLE PLATE FLOW-RATE MEASURING DEVICE

[75] Inventor: Akinori Yokota, Yokohama, Japan

[73] Assignee: Nissan Motor Company, Limited, Yokohama, Japan

[21] Appl. No.: 703,292

[22] Filed: Jul. 7, 1976

[30] Foreign Application Priority Data

Jul. 8, 1975 Japan .................................. 50/83883

[51] Int. Cl.² .............................................. G01F 3/14
[52] U.S. Cl. ..................................................... 73/252
[58] Field of Search ...................... 73/194 B, 252, 253

[56] References Cited

U.S. PATENT DOCUMENTS

| | | | |
|---|---|---|---|
| 203,812 | 5/1878 | Austin | 73/252 |
| 213,944 | 4/1879 | Sanford | 73/252 |
| 264,975 | 9/1882 | Norden | 73/252 |
| 2,453,376 | 11/1948 | Lagasse | 73/194 |
| 3,824,855 | 7/1974 | Heckle | 73/194 |

*Primary Examiner*—Herbert Goldstein
*Attorney, Agent, or Firm*—Lowe, King, Price & Markva

[57] ABSTRACT

A flow-rate measuring device comprises a chamber and an inlet channel for receiving and introducing a flow of fluid to the chamber. A wobble plate is pivotally disposed in the chamber to equally divide it into first and second chamber portions when in equilibrium position. First and second discharge channels are connected to the first and second chamber portions, respectively. Part of the chamber wall serves as an arcuate baffle extending between the first and second discharge channels. The pivot point of the wobble plate lies at the center of curvature of the arcuate baffle surface.

6 Claims, 4 Drawing Figures

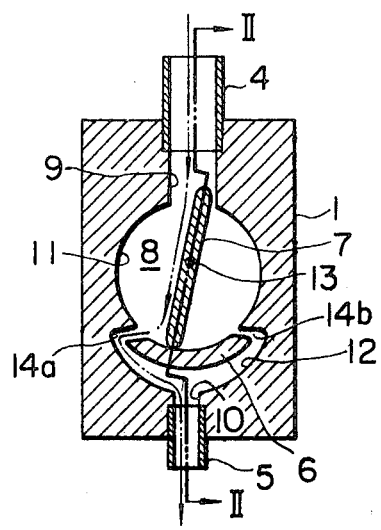
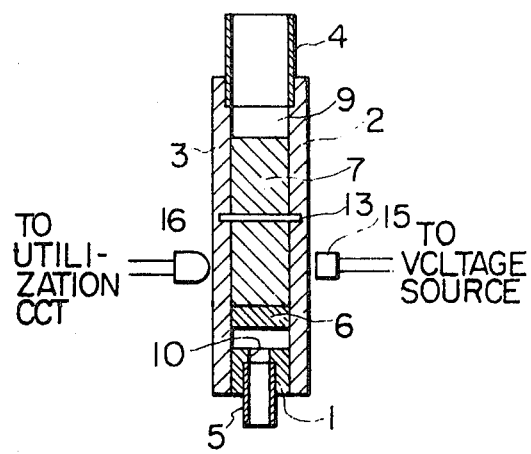
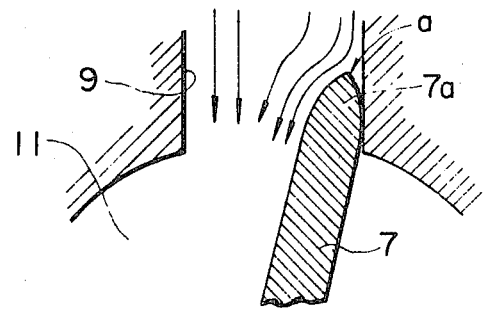
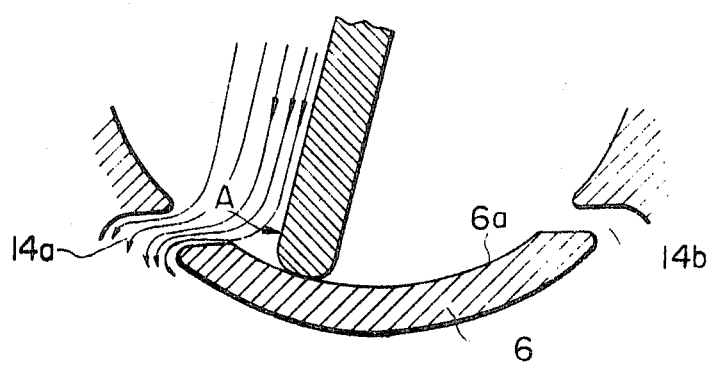
FIG. 1
FIG. 2
FIG. 3

WOBBLE PLATE FLOW-RATE MEASURING DEVICE

The present invention relates to flow measurement, and in particular to a flow-rate measuring device of a wobble plate type particularly suitable for slow-rate flow measurement.

An object of the present invention is to provide a novel flow-rate measuring device utilizing the wobbling motion of a plate pivotally disposed in the passage of a flow due to pressures generated by the change of direction of the flow by the wobbling plate and a baffle having a tangential surface to the wobbling plate.

Another object of the invention is to provide a flow-rate measuring device which is compact and easy to manufacture.

A further object of the invention is to provide a flow-rate measuring device which permits measurement of slow flow rate.

In accordance with the present invention, a flow-rate measuring device comprises a chamber, an intake channel connected to the chamber to introduce a flow of fluid thereinto, a wobble plate disposed in the chamber longitudinally parallel to the direction of flow to equally divide the chamber into first and second chamber portions when the wobble plate is in an equilibrium position and rotatable about a transverse axis thereof; and first and second discharge channels connected to the first and second chamber portions, respectively.

Preferably, part of the chamber is defined by a curved surface which extends between the first and second discharge channels to serve as a baffle which is tangential to the wobble plate. The fluid introduced into the intake channel is directed by the wobble plate into one of the first and second chamber portions depending on to which side the wobble plate is inclined and further directed to the associated discharge channel by the working surface of the baffle. The wobble plate is then caused to rotate about the transverse pivot axis by pressures exerted thereupon when the direction of flow is altered by the baffle so that the wobble plate is inclined to reverse side. The intake flow will then be directed to the opposite chamber portions and a similar process occurs when the flow direction is bent by the baffle this time in the opposite direction to thereby allow the wobble plate to return to the first position of inclination. This process will be repeated causing the wobble plate to rotate through a limited angle at an interval proportional to the flow rate. The frequency or number of rotations per unit time is a direct measure of flow rate.

The invention will be further described by way of example in connection with the accompanying drawings, in which:

FIG. 1 is a side elevation in cross-section of a flow-rate measuring device of the invention;

FIG. 2 is a cross-sectional view taken along the lines II—II of FIG. 1;

FIG. 3 is a partial enlarged view of the device useful for describing the operation of the invention.

Figure 4:
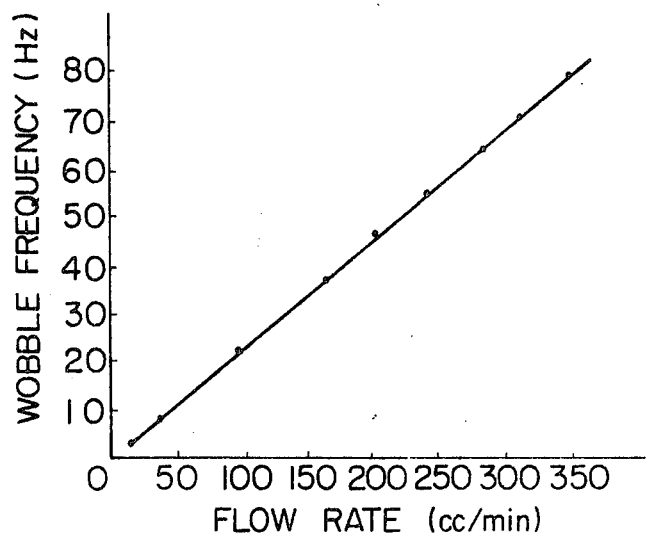
FIG. 4 is a graph illustrating flow rate versus wobble frequency relation of the flow-rate measuring device.

Referring now to FIGS. 1 to 3, a flow rate measuring or sensing device in accordance with the present invention comprises a cavity block 1, flat side plates 2 and 3, and inlet port 4, and outlet port 5, an arcuate baffle plate 6 and a pivoted wobble plate 7. The block 1 is formed with a hollow space 8 which extends in one direction through block 1 and forms a slot 9 and in the opposite direction to form a slot 10. The slots 9 and 10 are connected to the inlet port 4 and the outlet port 5 to respectively serve as an intake channel for introducing fluid into the cavity 8 and as an outlet channel for discharging the fluid. Plates 2 and 3 are secured to the opposite sides of the block 1 with the baffle plate 6 therebetween. The baffle plate 6 has a part-circular surface 6a and divides the cavity 8 into a disc-like chamber 11 and outlet channels 12. The outlet channels 12 extend between the opposite edges of the baffle plate 7 and the inner wall of chamber 11 to form first and second discharge channels 14a and 14b. Wobble plate is pivotally supported by the side plates 2 and 3 as at 13 and extends from the adjacent wall of the baffle plate 6 to the intake channel 9 and partly thereinto. The pivot 13 is located at the center of curvature of the baffle plate 6. The discharge channels 14a and 14b are aligned to each other in symmetrical positions relative to the pivot 13, and extend in a direction normal to the direction of flow through the intake channel 9. As clearly seen in FIG. 3, the wobble plate 7 decreases in thickness toward the upper end which extends partly into the slot 9. The inlet port 4 is adapted to be connected to a source of fluid under pressure or upstream side of a fluidic flow, and the outlet port 5 is adapted to be connected to the downstream side of the flow.

Assume that, in operation, the wobble plate 7 is in an inclined position as indicated in the drawings, the pressurized fluid introduced into the intake channel 7 will flow into the disc-like chamber 11 on the left side of wobble plate 7 and follows the paths as indicated by the arrows in FIG. 3. The fluid follows the surface of wobble plate 7 and hits the baffle plate 6 which directs the flow to the discharge channel 14a. As the fluid changes its direction at the end of wobble plate 7, a pressure is produced in a direction as indicated by arrow A and the wobble plate is caused to rotate about pivot 13 in a counterclockwise direction. In addition, a stagnant flow will be produced in an area $a$ defined by one of the tapered surfaces of wobble plate 7 and the adjacent wall of the slot 9. This stagnation produces a higher pressure than that produced on the opposite side of the tapered surfaces and tends to rotate the wobble plate in a counterclockwise direction.

Due to inertia the wobble plate 7 continues to rotate in the same direction and moves past a point where it bisects the chamber 11. Immediately after it passes the bisecting plane, the fluid in the intake channel will be directed into the right half portion of chamber 11 and tend to rotate the wobble plate 7 further in the same direction until it reaches a point where the fluid that follows the right side of the wobble plate reaches the lower end thereof and produces a pressure that causes it rotate in reverse (clockwise) direction. Stagnation of flow occurs this time to the left of the wobble plate 7 to cause it to rotate clockwise.

This process will repeat as long as the fluid continues to flow, and as a result plate 7 wobbles about its transverse axis at a frequency as a function of the rate of flow.

The flow measuring device constructed in accordance with the invention is particularly suitable for measuring a comparatively small flow rate because of the various pressure producing means which act upon the wobble plate 7. FIG. 4 illustrates that the wobble frequency is linearly proportional to the flow rate.

To measure the wobble frequency, the flow meter of the invention is provided with a light-emitting diode 15 disposed adjacent the side panel 2 and a phototransistor 16 in opposed relation to the LED 155 to receive the transmitted light. The signal level received by the phototransistor 16 varies in accordance with the interception of light by the wobble plate 7. In this particular embodiment, it is necessary that the side panels 2 and 3 be constructed of transparent material. The output signal from phototransistor 16 is coupled to a utilization circuit (not shown) which serves to translate the sensed frequency signal to an analog or digital quantity.

In the foregoing description, the wobble plate 7 was described as being pivoted at 13 by the side plates 2 and 3. However, an experiment showed that the wobbling motion occurs even though the pivot point of the wobble plate is not supported by the side plates 2 and 3.

The foregoing description shows only a preferred embodiment of the present invention. Various modifications are apparent to those skilled in the art without departing from the scope of the present invention which is only limited by the appended claims. Therefore, the embodiment shown and described are only illustrative, not restrictive.

What is claimed is:

1. A flow rate measuring device comprising a casing provided with a chamber, an inlet channel and an outlet channel, a baffle plate having a part-circular surface for dividing the chamber into a forward chamber portion connected to the inlet channel and a rearward chamber portion connected to the outlet channel, said forward and rearward chamber portions being connected by first and second connecting open channels formed at opposite ends of said baffle plate, and a wobble plate pivotally mounted on a transverse shaft in said forward chamber portion and rotatable about said transverse shaft between two extreme positions between said open channels, said transverse shaft being located in a position which substantially divides the wobble plate into equal working sections, the center of curvature of said baffle plate being located at the position of said transverse shaft so that the rearward end of the wobble plate closely follows the curvature of said baffle plate as the wobble plate rotates about said transverse shaft, flow of fluid into the inlet channel of said device and along one side of said wobble plate urging the forward end of the wobble plate into contact with a surface of said inlet channel, the flow of fluid being altered by said baffle plate and passing through the outlet channel on said one side of said wobble plate, the fluid thereby causing the plate to oscillate at a frequency that is a function of the rate of flow of said fluid.

2. A flow rate measuring device as claimed in claim 1, wherein the forward end of said wobble plate has a taper and extends partly into said intake channel to define an area with an adjacent wall of said intake channel when the wobble plate is in one of said extreme positions to produce a stagnation pressure in said area.

3. A flow rate measuring device as claimed in claim 1, wherein said forward chamber portion has a wall defining a disc-like configuration with the center of the disc-like configuration being located at said transverse shaft.

4. A flow rate measuring device as claimed in claim 1, wherein said first and second connecting channels are symmetrically disposed relative to said transverse shaft.

5. A flow rate measuring device as claimed in claim 4, wherein said first and second connecting channels are aligned in a direction normal to the direction of fluidic flow through said intake channel.

6. A flow rate measuring device as claimed in claim 1, wherein said casing is formed of a transparent material, further comprising a light source for transmitting light through said casing and said forward chamber portion, and light-sensitive means disposed to receive the transmitted light.

* * * * *